US007272119B2

(12) United States Patent
Rudnick et al.

(10) Patent No.: US 7,272,119 B2
(45) Date of Patent: Sep. 18, 2007

(54) METHODS AND SYSTEMS FOR QUALITY OF SERVICE IN NETWORKS COMPRISING WIRELESS DEVICES

(75) Inventors: William Michael Rudnick, Pittsford, NY (US); John M. Kowalski, Camas, WA (US); Srinivas Kandala, Cupertino, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 894 days.

(21) Appl. No.: 10/063,756

(22) Filed: May 10, 2002

(65) Prior Publication Data

US 2002/0163928 A1 Nov. 7, 2002

Related U.S. Application Data

(63) Continuation-in-part of application No. 09/800,334, filed on Mar. 5, 2001, now Pat. No. 6,839,331, application No. 10/063,756, which is a continuation of application No. 09/795,539, filed on Feb. 28, 2001, now abandoned.

(60) Provisional application No. 60/245,546, filed on Nov. 2, 2000, provisional application No. 60/245,646, filed on Nov. 2, 2000.

(51) Int. Cl.
*H04Q 7/00* (2006.01)

(52) U.S. Cl. ...................... 370/329; 370/341; 370/346; 370/444; 370/455

(58) Field of Classification Search ................ 370/329, 370/341, 346, 347, 348, 349, 444, 443, 449, 370/455
See application file for complete search history.

(56) References Cited

U.S. PATENT DOCUMENTS

| | | | | |
|---|---|---|---|---|
| 5,596,577 | A * | 1/1997 | Perreault et al. | 370/449 |
| 6,285,665 | B1 * | 9/2001 | Chuah | 370/319 |
| 6,515,972 | B1 * | 2/2003 | Gage et al. | 370/328 |
| 6,542,495 | B1 * | 4/2003 | Sugita | 370/347 |
| 6,747,968 | B1 * | 6/2004 | Seppala et al. | 370/338 |
| 6,879,579 | B1 * | 4/2005 | Myles et al. | 370/348 |
| 7,068,633 | B1 * | 6/2006 | Ho | 370/338 |

* cited by examiner

*Primary Examiner*—Chi Pham
*Assistant Examiner*—Shick Hom
(74) *Attorney, Agent, or Firm*—Krieger Intellectual Property, Inc.; Scott C. Krieger

(57) ABSTRACT

Embodiments of the present invention comprise systems and methods for providing transmission priority to stations in a wireless LAN system.

3 Claims, 6 Drawing Sheets

Establish Priority Polling List 70
Add STA IDs to Polling List 72
Is STA listed on Priority List Ready to Communicate ? 74
No
Deny Access
Increment to next STA 76
Yes
Allow Access 78

METHODS AND SYSTEMS FOR QUALITY OF SERVICE IN NETWORKS COMPRISING WIRELESS DEVICES

RELATED REFERENCES

This application is a continuation-in-part of U.S. patent application Ser. No. 09/795,539, entitled Quality of Service Using Wireless LAN, invented by William Michael Rudnick, John Michael Kowalski & Srinivas Kandala, filed Feb. 28, 2001, now abandoned; which claims the benefit of U.S. Provisional Patent Application Ser. No. 60/245,546, entitled "Method to Dynamically Adapt both Modifiable and Non-Modifiable Parameters of a Wireless Data Network, invented by William Michael Rudnick and filed on Nov. 2, 2000; said application also claims the benefit of U.S. Provisional Patent Application Ser. No. 60/245,646, entitled "Automated Method to Dynamically Change Channels in a Wireless Network", invented by William Michael Rudnick and filed on Nov. 2, 2000; this application is also a continuation-in-part of U.S. patent application Ser. No. 09/800,334, entitled "Method to Dynamically Change All MIB Parameters of a Wireless Data Network", invented by William Michael Rudnick, filed Mar. 5, 2001, now U.S. Pat. No. 6,839,331; which claims the benefit of U.S. Provisional Patent Application Ser. No. 60/245,546, entitled "Method to Dynamically Adapt both Modifiable and Non-Modifiable Parameters of a Wireless Data Network", invented by William Michael Rudnick and filed on Nov. 2, 2000; said application also claims the benefit of U.S. Provisional Patent Application No. 60/245,646, entitled "Automated Method to Dynamically Change Channels in a Wireless Data Network", invented by William Michael Rudnick and filed on Nov. 2, 2000.

BACKGROUND OF INVENTION

This invention relates to Quality of Service improvements in wireless LAN systems. Some embodiments relate specifically to quality of service enhancements in the IEEE 802.11 WLAN standard.

The IEEE's standard for wireless LANs, designated IEEE 802.11, provides two different ways to configure a network: ad-hoc and infrastructure. In an ad-hoc network, computers form a network on the fly, wherein each computer or 802.11 device joining the network is able to send and receive signals. There is no defined structure in an ad-hoc network; there are no fixed points; and every node in the network is able to communicate with every other node in the network. Although it may seem that order would be difficult to maintain in this type of network, sufficient algorithms, such as the spokesman election algorithm (SEA), are provided and are designed to elect one machine as the base, or master, station of the network, with the others machines being slaves. Another algorithm in ad-hoc network architectures uses a broadcast and flooding method to all other nodes to establish the identity of all nodes in the network.

The infrastructure architecture of an exemplary network comprising 802.11-like wireless devices and connectivity is shown in FIG. 1. In a typical network, wireless network stations 32 & 34 that share wireless connectivity in a first Basic Service Area (BSA) 40 may be organized into a first Basic Service Set (BSS1) 42 that can be controlled by a single coordination function. A network may comprise a plurality of BSSs that are linked together. A second BSS 44 (BSS2), comprising wireless stations 46 & 48 that may exist within a network, but outside the BSA 40 of a first BSS 42.

These stations may be able to communicate with each other within a second BSA 50, but do not have the range or other capability to access stations 32 & 34 outside their BSA 50. Coordination within a BSS 42 & 44 may be controlled by coordination functions comprising a Distributed Coordination Function (DCF) and a Point Coordination Function (PCF). When using a PCF, a single station 32, 34, 46 or 48 within a BSS 42 or 44 performs coordination function logic. This PCF station may also serve as an Access Point (AP) 34, 46 that controls access to network elements outside of the BSS 42, 44.

Wired networks 52 may also be connected to wireless network BSSs 42, 44 through portals 54 that implement distribution system service (DSS) functions to access a distribution system (DS) 56 that connects to BSS APs 34, 46 thereby forming a single functional network. A plurality of BSSs 42, 44 may also be linked through an Extended Service Set (ESS) 58 that links BSSs into a single logical network.

APs may act as fixed network access points for communications with mobile stations. These APs may be connected to land lines to widen the LAN's capability by bridging wireless nodes to other wired nodes. If service areas overlap, handoffs may occur between wireless LANs. This structure is very similar to that used in cellular networks.

The IEEE 802.11 standard places specifications on the parameters of both the physical (PHY) and medium access control (MAC) layers of the network. The PHY layer, which actually handles the transmission of data between nodes, may use either direct sequence spread spectrum, frequency-hopping spread spectrum, or infrared (IR) pulse position modulation. IEEE 802.11 makes provisions for data rates of up to 11 Mbps, and requires operation in the 2.4-2.4835 GHz frequency band, in the case of spread-spectrum transmission, which is an unlicensed band for industrial, scientific, and medical (ISM) applications; and in the 300-428,000 GHz frequency band for IR transmission. Infrared is generally considered to be more secure to eavesdropping, because IR transmissions require absolute line-of-sight links, i.e., no transmission is possible outside any simply connected space or around corners, as opposed to radio frequency transmissions, which can penetrate walls and be intercepted by third parties unknowingly. However, infrared transmissions can be adversely affected by sunlight, and the spread-spectrum protocol of 802.11 does provide some rudimentary security for typical data transfers. The 802.11b physical layer (PHY) provides data rates up to 11 Mbps using a direct sequence spread spectrum (DSSS) approach; while 802.11a provides data rates up to 54 Mbps using an orthogonal frequency division multiplex (OFDM) approach.

The MAC layer includes a set of protocols which is responsible for maintaining order in the use of a shared medium. The 802.11 standard specifies a carrier sense multiple access with collision avoidance (CSMA/CA) protocol. In this protocol, when a node receives a packet to be transmitted, it first listens to ensure no other node is transmitting. If the channel is clear, it then transmits the packet. Otherwise, it chooses a random backoff factor, which determines the amount of time the node must wait until it is allowed to transmit its packet. During periods in which the channel is clear, the transmitting node decrements its backoff counter. When the channel is busy it does not decrement its backoff counter. When the backoff counter reaches zero, the node transmits the packet. Because the probability that two nodes will choose the same backoff factor is small, collisions between packets are minimized.

Collision detection, as is employed in Ethernet®, cannot be used for the radio frequency transmissions of IEEE 802.11, because when a node is transmitting, it cannot hear any other node in the system which may be transmitting, because its own signal will block any other signals arriving at the node. Whenever a packet is to be transmitted, the transmitting node may first send out a short ready-to-send (RTS) packet containing information on the length of the packet. If the receiving node hears the RTS, it responds with a short clear-to-send (CTS) packet. After this exchange, the transmitting node sends its packet. When the packet is received successfully, as determined by a cyclic redundancy check (CRC), the receiving node transmits an acknowledgment (ACK) packet. This back-and-forth exchange is necessary to avoid the hidden node problem, i.e., node A can communicate with node B, and node B can communicate with node C. However, node A cannot communicate with node C. Thus, for instance, although node A may sense the channel to be clear, node C may in fact be transmitting to node B. The protocol described above alerts node A that node B is busy, and requires node A to wait before transmitting its packet.

Although 802.11 provides a reliable means of wireless data transfer, some improvements to it have been proposed. The use of wireless LANs is expected to increase dramatically in the future as businesses discover the enhanced productivity and the increased mobility that wireless communications can provide.

IEEE Standard 802.11 (1999) for wireless local area networks (WLAN) does not support Quality of Service (QoS) traffic delivery in its MAC layer. A method to provide Quality of Service traffic delivery for IEEE Standard 802.11 WLAN systems is desirable to enhance communications reliability for 802.11 devices.

There is an 802.11 Task Group e (TGe) joint proposal to support QoS enhancements. Virtual streams having QoS parameter values including priority, data rate, delay bounds and jitter bounds, are supported. The proposal uses an enhanced point coordination (PC) function (EPCF), featuring centralized contention control for sending reservation request frames to request new bandwidth allocations. Several new data and management frames are used. New acknowledgement policies, direct station-to-station transfers, basic service set (BSS) overlap management, and dynamic wireless repeater functions are included. This proposal requires modification of the existing 802.11 standard, and may not support, or be supported by, legacy 802.11 devices.

The subject IEEE standard is set forth in ISO/IEC 8802: 1999(E) IEEE Std 802.11, 1999 edition, International Standard [for] Information Technology—Telecommunications and information exchange between systems—Local and metropolitan area networks—Specific Requirements—Part 11: Wireless LAN Medium Access Control (MAC) and Physical Layer (PHY) specifications.

QoS issues are discussed in the following references:U.S. Pat. No. 6,049,549 to Ganz et al., granted Apr. 11, 2000, for Adaptive medium control, describes an approach to QoS having a polling manager, which uses just in time polling based on allocated bandwidth, and a resource manager, which provides admission control and allocates network resources.

U.S. Pat. No. 5,970,062 to Bauchot, granted Oct. 19, 1999, for Method and apparatus for providing wireless access to an ATM network, describes an ATM MAC approach to QoS.

U.S. Patent No. 5,787,080 to Hulyalkar et al., granted Jul. 28, 1998, for Method and apparatus for reservation-based wireless ATM local area network, describes a reservation-based mobile wireless MAC-arbitrated QoS method for use with automated teller machines. The techniques are not compatible with packet-data WLANs.

U.S. Pat. No. 5,745,480 to Behtash et al., granted Apr. 28, 1998, for Multi-rate wireless communications system, describes a communication-negotiated QoS for use in a wireless radio system provided by directly modifying the encoding used to allocate the desired bandwidth, however, such a system is not compatible with packet-data WLANs.

SUMMARY OF INVENTION

The present invention comprises methods and systems for providing Quality of Service (QoS) in a network comprising wireless network devices.

BRIEF DESCRIPTION OF DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
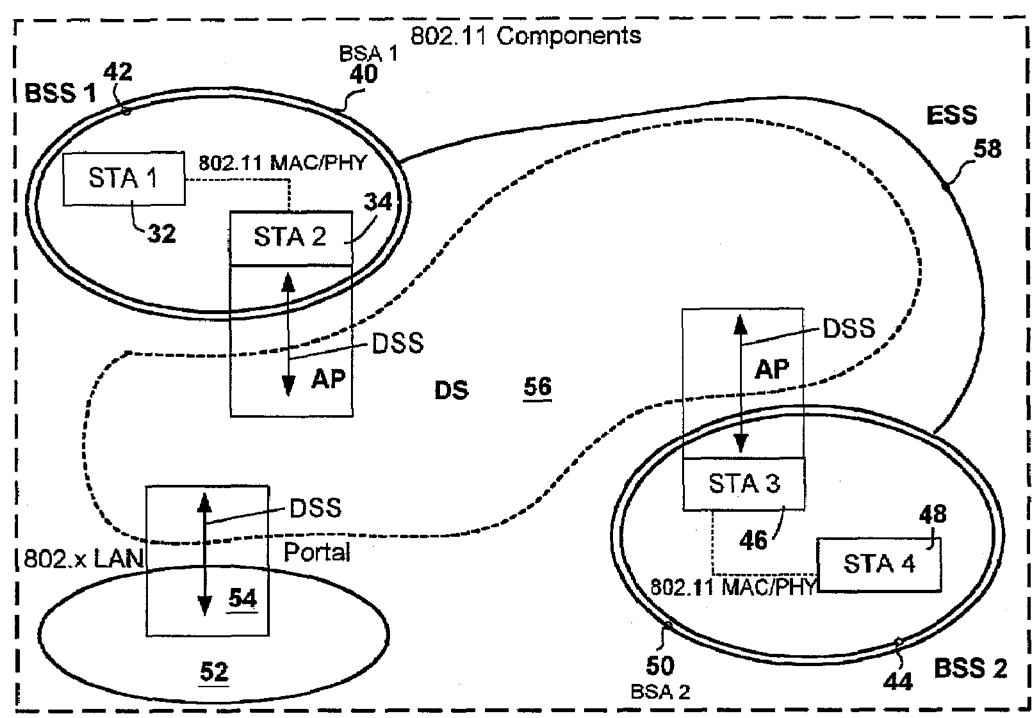
FIG. 1 is a diagram of an exemplary network comprising wireless BSSs and other network elements.

The IEEE 802.11 wireless LAN (WLAN) standard provides a point coordination function/distributed coordination function (PCF/DCF) distinction as its only differentiated service. A two-class differential service may be based upon the PCF/DCF distinction and will provide limited Quality of Service (QoS). The invention disclosed herein provides a method to provide QoS traffic delivery for IEEE Standard 802.11 WLAN PCF mechanisms by use of the contention free period (CFP) established in the 802.11 standard. The primary distinction of the method of the invention is that many classes of service may be provided and each class of service may be assigned an arbitrary proportion of the available transmit opportunities.

The aforementioned TGe joint proposal significantly extends the current 802.11 specification to support a rich, full-featured QoS, at the cost of considerable additional complexity and overhead. The method of the invention provides a differentiated-services type QoS, requiring minimal change to the current 802.11 specification, and imposes minimal additional complexity. The method of the invention is simple to implement, yet provides adequate QoS for many 802.11 applications, and supports legacy devices as well.

WLAN under 802.11 is instantiated through a basic service set (BSS). The BSS is the WLAN analogue of a wired local area network. An infrastructure BSS, usually referred to simply as a BSS, has an access point (AP) which serves as a central coordinator for the BSS. An independent basic service set (IBSS), used in an ad-hoc network, has no AP, i.e., no central coordinator. The AP tasks in a IBSS are shared among the stations (STAs) comprising the IBSS. A BSS is identified by its BSS IDentification (BSSID) value.

As used herein, BSS means an infrastructure BSS, vs. an Independent BSS, unless otherwise noted. All references to clauses, annexes and 802.11 refer to the ISO/IEC 8802-11 (ANSI/IEEE Std 802.1) 1999 document Information technology—Telecommunications and information exchange between system—Local and metropolitan area networks—Specific requirements—Part 11: Wireless LAN Medium Access Control (MAC) and Physical (PHY) specifications.

Under 802.11, timing is coordinated across the BSS by broadcasting a beacon frame at a specified time interval. The time at which the beacon should be sent is called the Target Beacon Transmit Time (TBTT). Selected beacons include a Delivery Traffic Indication Message (DTIM) field, used to indicate pending traffic on a station-specific basis.

All time in an 802.11 WLAN may be broken into contention periods (CP), when more than one device may attempt to send data, and contention-free periods (CFP), when no or one device attempts to send data. Access to the wireless media during the CFP is controlled by a centralized PCF, residing in an AP STA. There may be no more than one AP in a BSS. Wireless media access during the CP uses distributed contention resolution and runs under DCF rules.

A beacon with a DTIM is used to begin the CFP. During the CFP, the PCF polls contention-free pollable (CF-pollable) STAs, drawn in association ID order (AID-order), from a polling list. The PCF maintains the polling list in AID-value order, beginning with smallest value.

For some traffic streams, low jitter, low latency, and high throughput are particularly important. Examples of such traffic streams include interactive audio and video applications, such as telephony and video conferencing. The existing 802.11 standard does not specifically provide the ability to support low jitter, low latency, and high throughput via policy decision, except by deploying very sparsely populated WLANs, e.g., one remote STA per WLAN, which is not a satisfactory solution.

The method of the invention includes the use of the algorithm detailed in 802.11 standard clause 9.3.4.1, paragraph 1, sentence 2, in a novel way to implement multi-tier prioritization of transmission opportunities based on the identity of the sending or receiving STA. This effects a rudimentary form of QoS. Ideally, admission controlled allocation of bandwidth should be used to implement priority-based QoS. However, because the size of frames which are transferred under 802.11 is largely outside the control of the AP, and because the size of frames have an upper size limit, transmission opportunities, which may be controlled, are used as a proxy for bandwidth. In cases where a major difference exists between bandwidth and transmission opportunities, the AP may make an adjustment to the allocated frequency of transmission opportunities to compensate for the differences.

Figure 2:
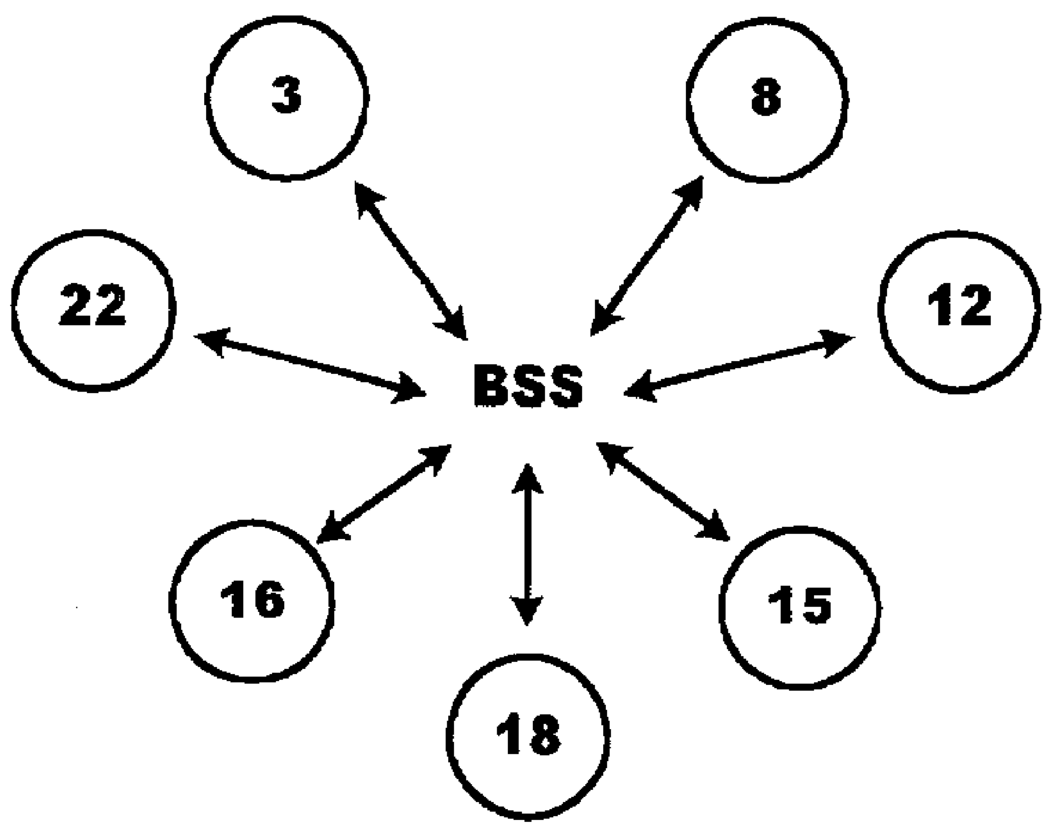
FIG. 2 is a block diagram of a BSS incorporating a method of the invention.

802.11 requires a subset of the polling list to be polled during each CFP in an order determined by ascending AID value. As used in the 802.11 standard, the term "subset" is not used in the mathematical sense of any mathematical subset of the polling list, rather, it is used as a sequence of less than all of the total polling list, and, as such, really means a sub-sequence, as all STAs are taken in AID-value order. Each CF-Poll provides a single CF-Pollable STA an opportunity to send a single fragment, wherein a fragment is synonymous with a medium access control (MAC) protocol data unit, or MPDU, and to receive a single fragment. The method of the invention is based on the fact that any selection of STAs on the polling list constitutes a mathematical—like subset of the polling list, and therefore satisfies the algorithm criteria specified in 802.11 section 9.3.4.1. The subset chosen need not consist of contiguous or adjacent STA AID values. For example, and now referring to FIG. 2, if the STAs whose AIDs are 3,8,12,15,16,18, and 22 are on the polling list, the subset of STAs selected might be {8, 15, and 18}. These would be the high-priority STAs which require QoS communications. 802.11 requires the subset to be polled in order of ascending AID value, so the polling order of the subset will begin with the STA whose AID value is 8, followed by the STA whose AID value is 15, and then finally the STA whose AID value is 18. A sub-sequence under 802.11 does not permit any STAs in the polling list to be polled out of AID-value order. Thus, if the method of the invention were used without modifying the 802.11 polling criteria, the sub-sequence might be {3, 8, 12} in a single CFP, thereby missing two of the three high-priority STAs.

During a single CFP, after all STAs on the polling list have been polled, and all CF frames have been delivered, 802.11 allows the PC to generate additional CF-Polls to any STAs on the polling list and/or additional data or management frames may be sent to any STAs. Thus, once the polling list subset, i.e., the active polling list subset, has been polled, if any STAs on the entire polling list have been skipped, i.e., were not included in the polling list subset, nothing more may be done during the CFP, because all STAs on the entire polling list have not been polled in AID value order. There is, however, an exception in the case where the polling list subset consists of some prefix sequence of the ordered list of the AIDs of all STAs on the polling list. In this exceptional case, the remainder of the polling list may be polled in AID-value order, followed by additional polls and/or data/management frame transfers. However, because most of the time, when a polling list subset is selected based upon current priority needs, a gap will occur, and a polling list STA will be skipped.

Returning to the normal case, presumably the PC will then end the CFP so that DCF transfers may take place. For ordinary CFP transfers this may be a problem, limiting the number of CFP polls performed, but is used in the method of the invention for implementing priority-based QoS. Under the method of the invention, it is desirable to make the CFPs short but frequent, i.e., only about as long as needed to CF-Poll the high-priority-traffic STAs. By doing so, the high-priority-traffic STAs are given access to a larger portion of the available transmission opportunities.

It is desirable that the CFP be only slightly longer than the time needed to service (CF-Poll) the high-priority STAs. It is also desirable that CFPs happen as often as possible so as to maximize the portion of the available transmission opportunities allocated to high-priority-traffic STAs. These goals may be accomplished by properly setting various 802.11 system parameters residing in the MAC management information base (MIB) of the AP, including: dot11CFPMaxDuration; dot11CFPPeriod; dot11 BeaconPeriod; and dot11DTIMPeriod.

It is understood that the simple act of the PC sending-the CF-End frame may make the CFP shorter, however, the CFP may not be made longer than the value set as dot11CFPMaxDuration, and the dot11CFPMaxDuration parameter is fixed for the life of the BSS when the BSS is first created. To allocate a larger portion of available transmission opportunities to the highest-priority-traffic STAs, the dot11CFPPeriod, dots11BeaconPeriod, and dot11DTIMPeriod parameters must be set so that the time from the start of one CFP to the start of the next CFP period is relatively small, but at least long enough so that at least one potentially max-sized frame may be transmitted and acknowledged (ACK'd) by each selected high-priority STA during a CFP. Because the dot11CFPPeriod parameter is fixed for the life of the BSS when the BSS is first created, this may be difficult to achieve. As STAs move among the priority levels, the size of the polling list subset, i.e., the frequently serviced STAs, will change, eventually necessitating a change to the max duration and/or frequency of the CFP. The remaining problem is that dot11CFPMaxDuration is also fixed for the life of the BSS when the BSS is first created.

To circumvent these limitations, the terminate and reconvene (TAR) and/or dynamic change channel (DCC) methods, described in the above-identified related applications, may be used to terminate and reconvene the BSS in an automated fashion. When the BSS is restarted, new values may be set for dot11 CFPPeriod and dot11CFPMaxDuration, as well as for dot11 BeaconPeriod and dot11DTIMPeriod, thereby dynamically adjusting the size and frequency of the CFP as the bandwidth and/or other requirements of the QoS priority queues change. Alternately, minor changes in the CFP duration and frequency, may be made by adjusting only the dot11 BeaconPeriod and dot11DTIMPeriod parameters, thereby avoiding the overhead associated with performing a TAR cycle.

Details regarding how a STA changes its priority level are not directly relevant to the multi-tier prioritization method described here, however, changes in STA priority may be made using three new messages, as follows: To change a STA's priority, the STA sends a priority request (PR) message to the AP. The AP contains a scheduler. The AP's scheduler responds with a priority grant (PG) message to the STA. After the STA acknowledges the PG, the AP/scheduler/PC moves the STA to the specified priority class and traffic for the STA to the corresponding priority queue. Similarly, the AP may initiate a change in STA priority as follows: the AP's scheduler verifies bandwidth is available. It then sends a priority change notice (PCN) to the STA. After the STA acknowledges the PCN, the AP/scheduler/PC moves the STA to the specified priority queue. Of course, other signaling and control methods are possible.

Note that one or more low-priority STAs may be included in the CF-Polling list subset polled during a CFP on a rotating basis to prevent starvation. An 802.11 device will typically be connected to a wired LAN at some point in the network, and the QoS enabled wired LAN negotiates the QoS depending on the nature of the data being transmitted by the 802.11 device. The provision of QoS transmission is dependent on the nature of the STA's device. An LCD television, for instance, will require QoS. The admission of such a device to the BSS brings with it the need for QoS transmission, as identified by the wired LAN.

Multi-tier priority-based QoS is implemented by controlling how frequently each STA appears in the polling list subset, and therefore, how frequently each STA receives a transmission opportunity. For example, suppose the bandwidth manager (BM) wanted to effect three priority levels, p1, p2, and p3, with p1 getting 50% of the available bandwidth, p2 getting 33%, and p3 getting the remaining 17%. Further, suppose the STA whose AID is 8 is the sole member of p1, the STA whose AID is 15 is the sole member of p2, and the STA whose AID is 18 is the sole member of p3. The following sequence of polling list subsets is one implementation of the desired priority relationships: {8}, {8,15}, {8,15,18}. This implementation accomplishes the desired allocation of transmission opportunities and, if all packets are of similar size, bandwidth as shown in the Table 1:

TABLE 1

| STA | Transmission Opportunities | % Transmission Opportunities | % Bandwidth |
|---|---|---|---|
| 8 | 3 | 50% | 50% |
| 15 | 2 | 33% | 33% |
| 18 | 1 | 17% | 17% |

However, if the BM detects that STA 8 packets are, on average, only half the size of STA 15 and STA 18 packets, the BM may adjust the allocation of transmission opportunities to compensate as follows: {8}, {8}, {8}, {8,15}, {8}, {8,15,18}. This accomplished the desired 50%, 33%, 17% allocation of bandwidth to STAs 8, 15, and 18, respectively, as shown in Table 2:

TABLE 2

| STA | Transmission Opportunities | % Transmission Opportunites | % Bandwidth |
|---|---|---|---|
| 8 | 6 | 67% | 50% |
| 15 | 2 | 22% | 33% |
| 18 | 1 | 11% | 17% |

A simple implementation of the method of the invention is to make the granularity of prioritization the STA. In this implementation, a STA with both high-priority and low-priority traffic will become a high-priority STA, depending upon policy. This means the low-priority traffic gets a free high-priority ride along with the high-priority traffic. The exact trade-off made is a policy decision and is implementation dependent. Another, albeit more complex, approach is to segregate traffic flows and make the granularity of prioritization the flow rather than the STA.

Finally, if the desire were to arise, AID values may be changed during the association phase of the TAR cycle. This could be used as a queuing algorithm simplification to give the highest priority STAs the lowest AIDS, which is useful under heavy load conditions when there is not time to serve the entire high-priority queue polling list subset of the polling list during a single CFP.

Figure 3:
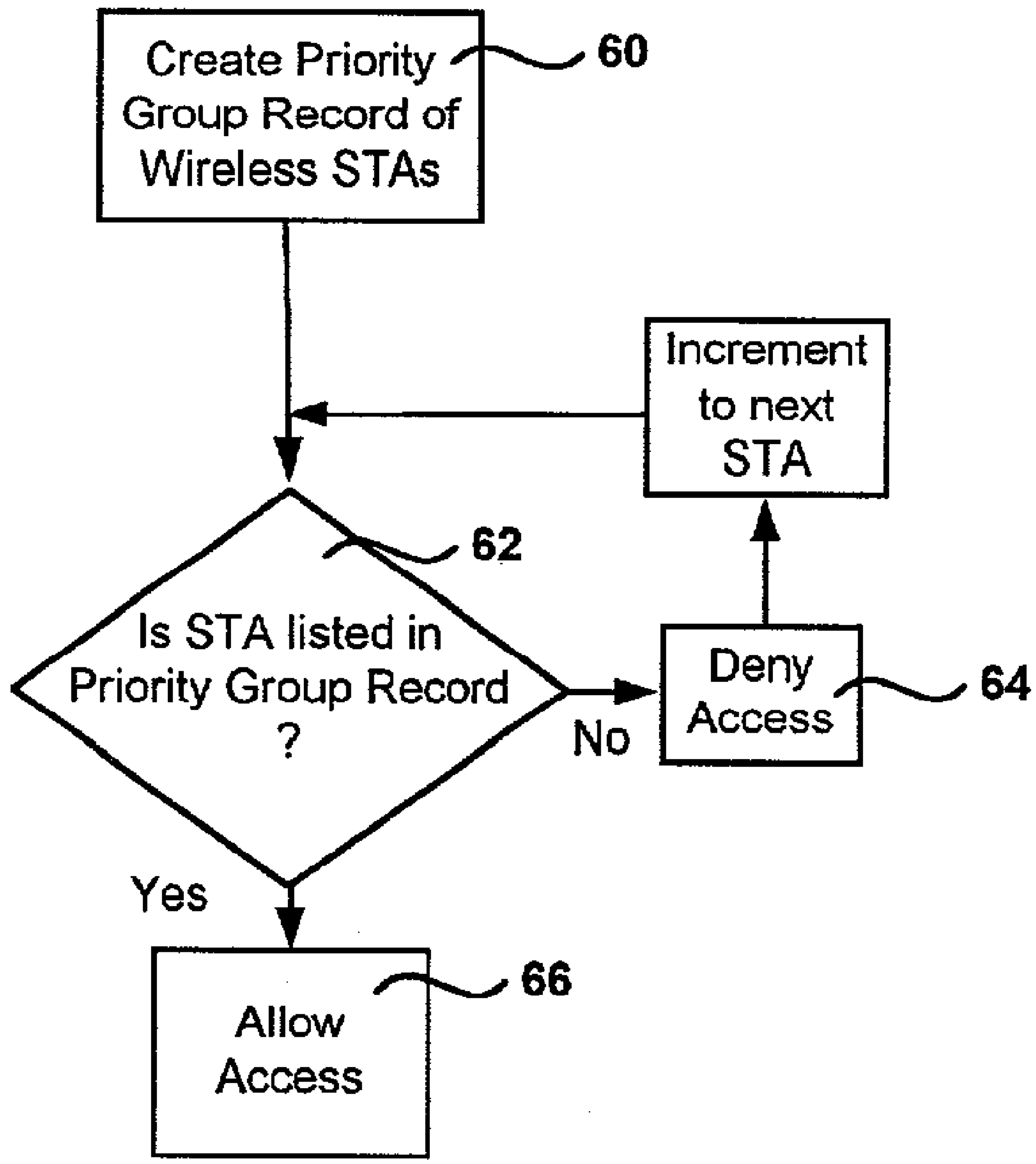
FIG. 3 is a diagram of an embodiment of the present invention comprising a priority group record.

In reference to FIG. 3, some embodiments of the present invention comprise a priority group record 60 which comprises identification data for priority stations within a network. Access to the network is regulated by a coordinator which accesses 62 the priority group record 60 when a station communicates a need for network access. If the station is identified in the priority group record 60, the coordinator allows the station to access the network 66. If the station is not identified in the priority group record 62, access is denied 64.

Figure 4:
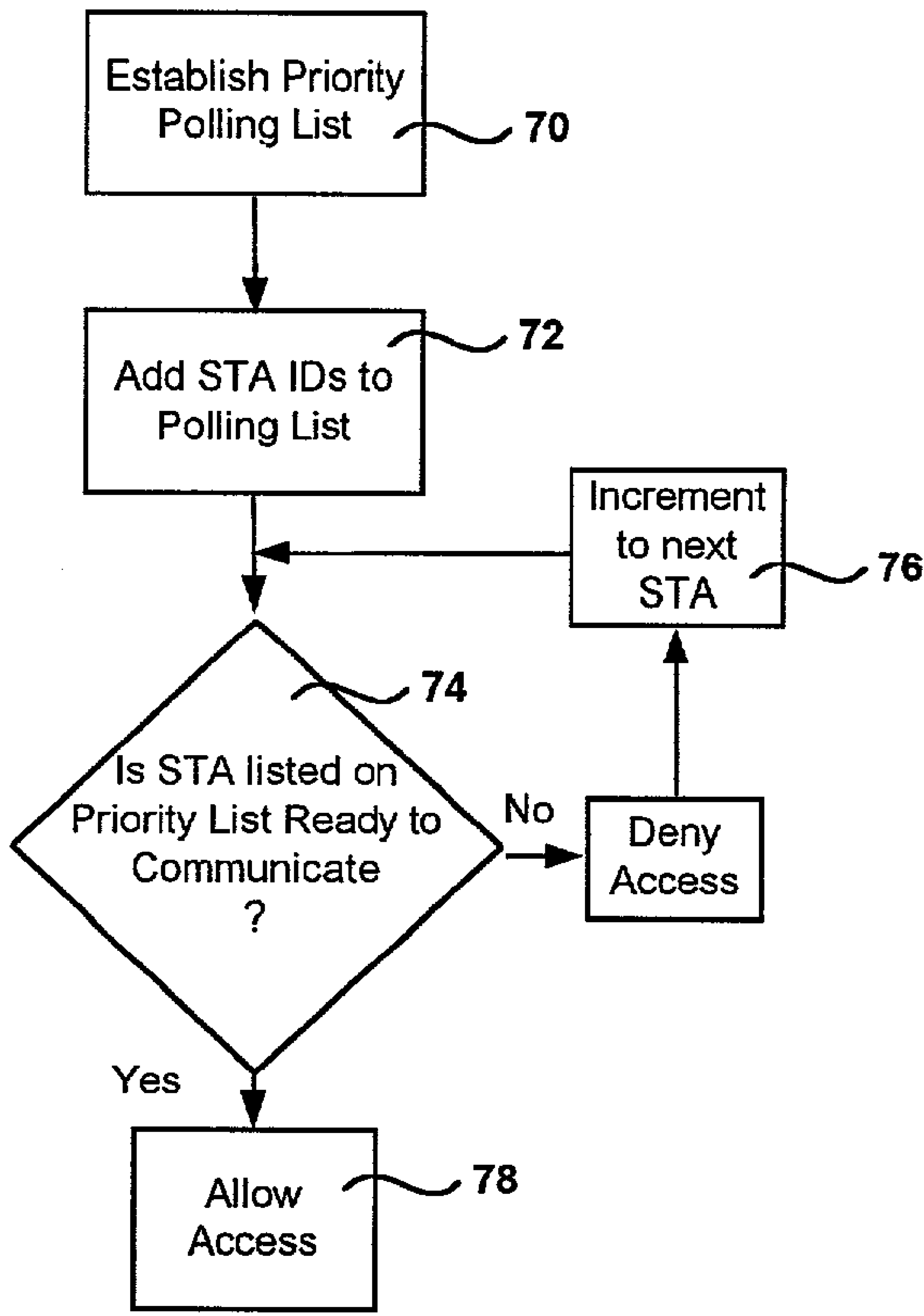
FIG. 4 is a diagram of an embodiment of the present invention comprising a priority polling list.

In reference to FIG. 4, some embodiments of the present invention comprise a priority polling list 70 to which station identifiers are added 72 when these stations are granted priority status. A coordinator may access the priority polling list 70 and poll the stations on the list to determine if they are ready to communicate 74. Stations that are not identified on the priority polling list are not polled. If a station on the priority polling list has a need to communicate over the network 74, access to the network will be granted 78. If the station does not need to communicate 74, the coordinator may increment through the priority list in an established order and step to the next station on the list until the list is exhausted.

Figure 5:
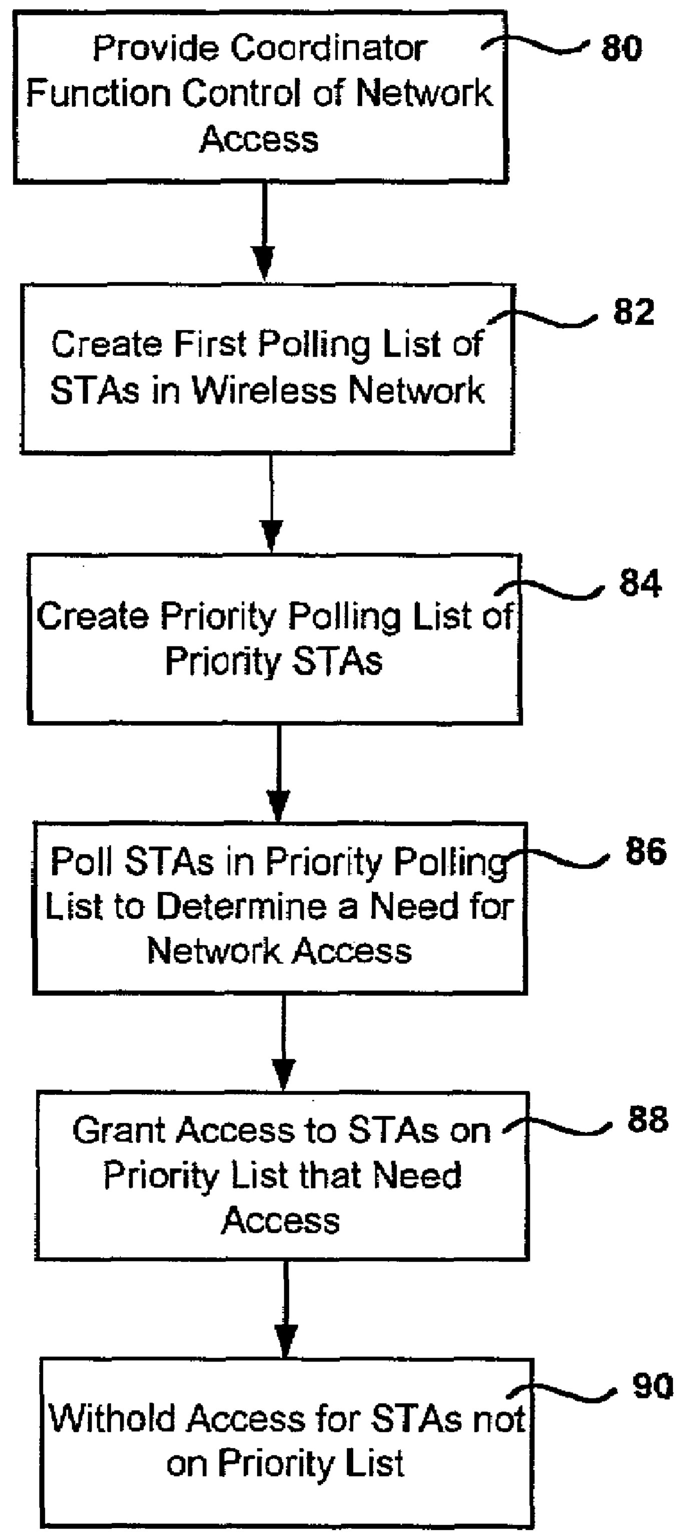
FIG. 5 is a diagram of an embodiment of the present invention comprising a general polling list and a priority polling list.

In reference to FIG. 5, some embodiments of the present invention comprise coordination function control that limits access to the network 80. In these embodiments, a first polling list 82 may be created that comprises identifiers for wireless stations in the network. These embodiments may further comprise a priority polling list 84 comprising identifiers for stations that are to have priority network access over other stations.

Once the polling lists have been established, the priority list 84 may be polled 86 to determine whether stations on the priority list have a need for network access. When stations on the priority list have a need for network access, access is granted 88. Access for stations not listed on the priority polling list is withheld 90 until all priority stations that need to access have had a chance.

Figure 6:
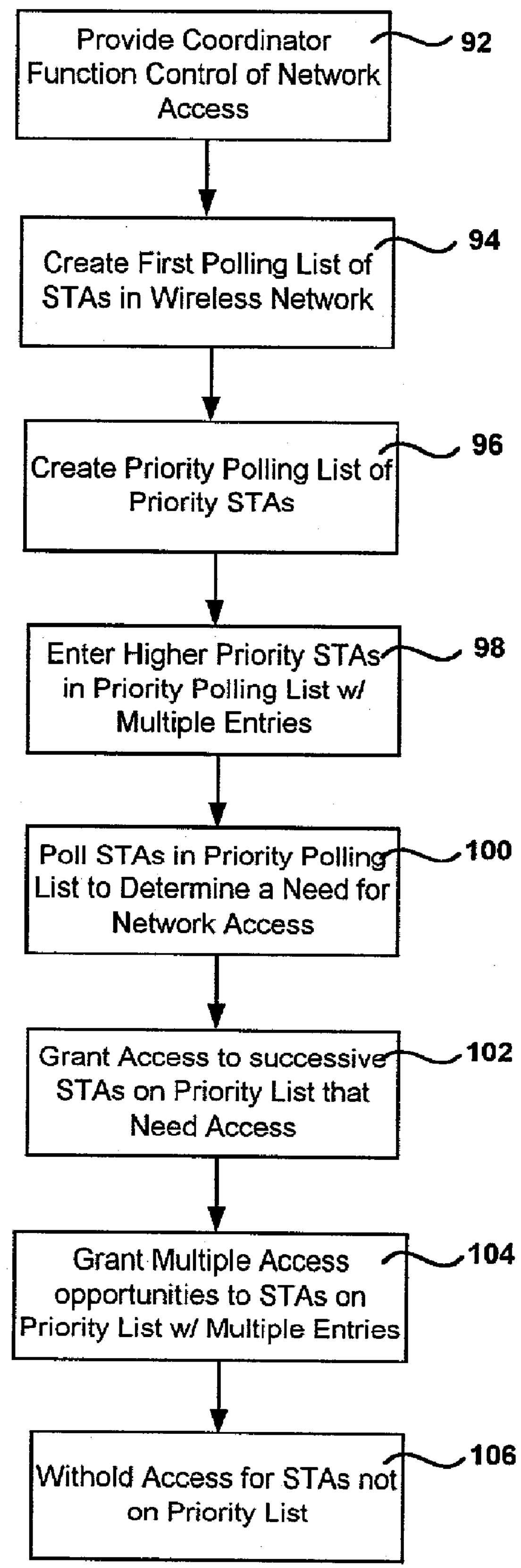
FIG. 6 is a diagram of an embodiment of the present invention comprising a general polling list and a priority polling list with multiple entries for high priority stations.

In reference to FIG. 6, some embodiments of the present invention comprise a coordination function 92 for network access control. Network access is controlled by coordination function 92 through the use of polling lists 94 and 96. A first polling list 94 is created, which lists stations in the wireless network. A second priority polling list 96 is also created, which comprises stations for which priority network access is desired. Priority polling list 96 may be a subset of first polling list 94. A priority heirarchy may be established by entering higher priority stations into the priority polling list 96 multiple times 98. In this manner, higher priority stations would receive more opportunities to gain network access. For example, a highest priority access level may be established by entering stations on the priority polling list 96 with 5 separate entries. A second priority tier may be established by entering some stations on the priority polling list 96 with 3 separate entries. Another priority tier may comprise stations listed on the priority polling list 96 with 2 entries and another lower priority tier may be established with stations listed with only one entry. In this example, the highest priority stations would be polled 5 times more often than the lowest priority stations on the priority polling list.

During polling periods, stations listed on the priority polling list 96 are polled 100 to determine whether they have a need for network access. If a station on the priority polling list 96 needs network access, access is granted by the coordination function 92. The coordination function 92 may progress through the priority polling list 96 to each successive station 102. When stations are listed with multiple entries, multiple access opportunities are created as these stations are polled multiple times. If these stations have a need for network access, multiple access opportunities are granted 104. During a typical polling period, access by stations that are not listed on the priority polling list 96 is witheld 106.

Thus, a method for providing QoS in IEEE 802.11 devices and similar devices has been disclosed. It will be appreciated that further variations and modifications thereof may be made within the scope of the invention as defined in the appended claims.

The invention claimed is:

1. A method of providing Quality of Service (QoS) prioritization for wireless network stations in a network, said method comprising:

establishing a priority polling list comprising an identifier for at least a first wireless network station for which communication priority is desired;

polling said priority polling list to determine whether said at least a first wireless network station identified on said priority polling list is ready to communicate on said network;

granting priority access to communicate over said network to said at least a first wireless network station, wherein said priority access gives said at least a first wireless network station priority over another wireless network station excluded from said priority polling list;

scheduling, wherein said scheduling comprises receiving priority requests from stations and adding stations to said priority polling list upon request;

sending a priority change notice to a station to indicate bandwidth is available and, upon acknowledgement from said station, increasing a priority level of said station to provide higher bandwidth to said station, when bandwidth is available.

2. An apparatus for providing Quality of Service (QoS) prioritization for wireless network stations in a network, said apparatus comprising:

a priority polling list comprising an identifier for at least a first wireless network station for which communication priority is desired;

a polling unit for polling stations on said priority polling list to determine whether said at least a first wireless network station identified on said priority polling list is ready to communicate on said network;

a coordinator for granting priority access to communicate over said network to said at least a first wireless network station, wherein said priority access gives said at least a first wireless network station priority over another wireless network station excluded from said priority polling list;

a bandwidth monitor for monitoring bandwidth availability;

a scheduler for scheduling, wherein said scheduling comprises receiving priority requests from stations and adding stations to said priority polling list upon request;

a priority manager for sending a priority change notice to a station to indicate bandwidth is available and, upon acknowledgement from said station, increasing a priority level of said station to provide higher bandwidth to said station, when bandwidth is available.

3. A method of providing Quality of Service (QoS) prioritization for at least one wireless network station in a network, said method comprising:

providing a coordination function that controls access to a network comprising wireless network stations, said controlled access occurring during a contention-free period;

providing a polling list comprising identifiers for a first group of said wireless network stations in said network;

providing a priority polling list comprising identifiers for a second group of said wireless network stations in said network, said second group consisting of stations for which communication priority is desired through a multi-level priority hierarchy in which more frequent access is granted to higher priority stations;

polling said wireless network stations with identifiers included in said priority polling list to determine whether said wireless network stations in said second group have information to communicate; and granting network communication access, through said coordination function, to said wireless network stations within said second group that have information to communicate.

* * * * *